(12) United States Patent
Fryman et al.

(10) Patent No.: US 8,312,225 B2
(45) Date of Patent: *Nov. 13, 2012

(54) METHOD AND APPARATUS FOR SUPPORTING SCALABLE COHERENCE ON MANY-CORE PRODUCTS THROUGH RESTRICTED EXPOSURE

(75) Inventors: Joshua B. Fryman, Sunnyvale, CA (US); Mohan Rajagopalan, Mountain View, CA (US); Anwar Ghuloum, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/156,777

(22) Filed: Jun. 9, 2011

(65) Prior Publication Data

US 2011/0238926 A1    Sep. 29, 2011

Related U.S. Application Data

(63) Continuation of application No. 12/005,785, filed on Dec. 28, 2007, now Pat. No. 7,984,244.

(51) Int. Cl.
*G06F 12/00* (2006.01)

(52) U.S. Cl. .............. 711/141; 711/163; 711/E12.069
(58) Field of Classification Search .................. None
See application file for complete search history.

(56) References Cited

U.S. PATENT DOCUMENTS

| 5,734,922 | A | 3/1998 | Hagersten et al. |
| 6,470,429 | B1 | 10/2002 | Jones et al. |
| 2007/0121659 | A1 | 5/2007 | Pong |

OTHER PUBLICATIONS

J. Risau, et al., "Software Controlled Cache Coherence in Shared-Memory Multiprocessors," Sep. 20, 1996, pp. 1-19.

*Primary Examiner* — Charles Rones
*Assistant Examiner* — Eric Loonan
(74) *Attorney, Agent, or Firm* — Trop, Pruner & Hu, P.C.

(57) ABSTRACT

In one embodiment, a multi-core processor having cores each associated with a cache memory, can operate such that when a first core is to access data owned by a second core present in a cache line associated with the second core, responsive to a request from the first core, cache coherency state information associated with the cache line is not updated. A coherence engine associated with the processor may receive the data access request and determine that the data is of a memory page owned by the first core and convert the data access request to a non-cache coherent request. Other embodiments are described and claimed.

18 Claims, 4 Drawing Sheets

METHOD AND APPARATUS FOR SUPPORTING SCALABLE COHERENCE ON MANY-CORE PRODUCTS THROUGH RESTRICTED EXPOSURE

This application is a continuation of U.S. patent application Ser. No. 12/005,785, filed Dec. 28, 2007, which is now U.S. Pat. No. 7,984,244, issued on Jul. 19, 2011, the content of which is hereby incorporated by reference.

BACKGROUND

Today's computer systems are ever evolving. Current systems can include one or more processors. These processors can be in separate processor packages or can be multiple cores in a single processor package. Furthermore, as time goes on, today's dual and quad core packages are likely to be extended to many-core processor packages including 8, 16 or even greater numbers of cores. Increased amount of cores present in a processor package can complicate various communications within a system.

For example, in many-core processor designs, where "many" is a large number, cache coherence protocols may cost dozens or hundreds of cycles in a miss or a location of contention. This overhead is not avoidable by the programmer, even when the programmer knows a priori the data access patterns of the application, and could theoretically remove extraneous coherence messages.

DETAILED DESCRIPTION

Figure 1:
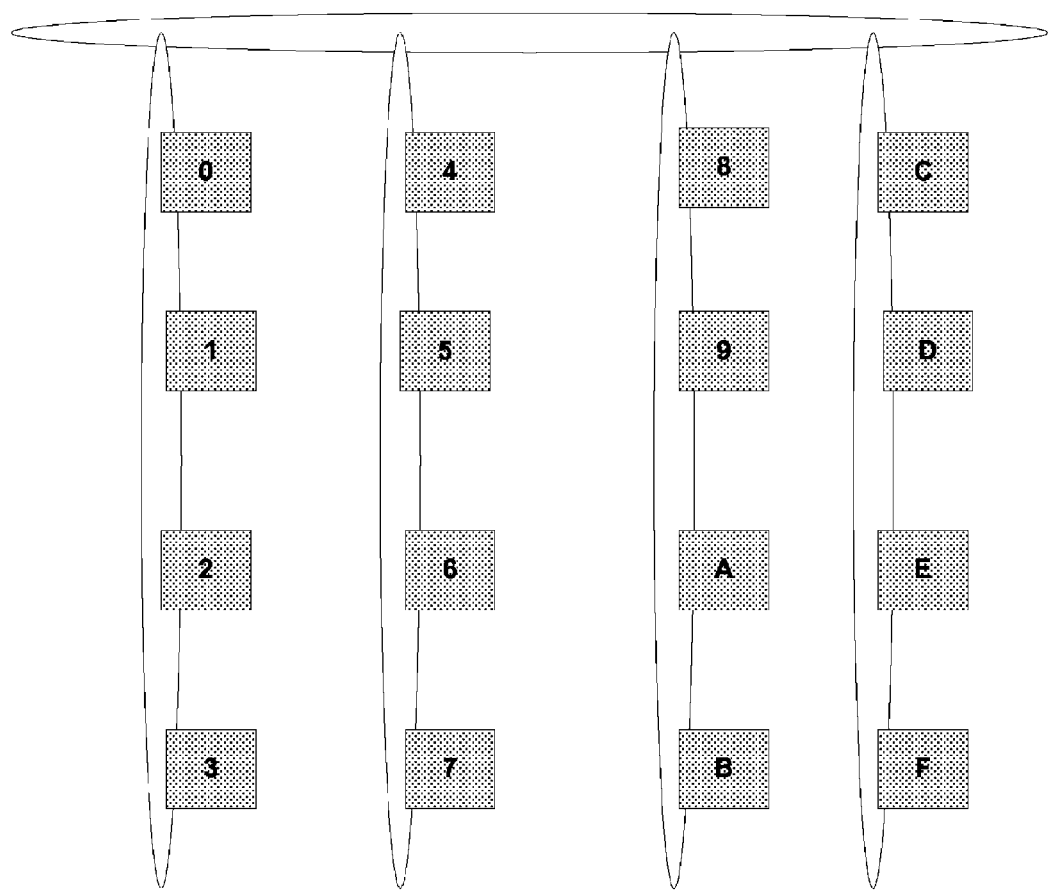
FIG. 1 is an illustrative example of a representative ring-of-rings model in accordance with one embodiment of the present invention.

Embodiments of the present invention provide an extension to cache coherence mechanisms to expose an extension for those programmers that seek to optimize data access where the programmer knows a priori data access patterns. In this way, the penalty cost of cache coherence is substantially reduced. As an illustrative example for the coherence cost inherent in many-core designs, a representative ring-of-rings model is shown in FIG. 1 for 16 cores. As shown in FIG. 1, a system 10 includes 16 cores, designated Cores 0-9 and A-F are shown, connected in a ring of rings topology. In one example implementation, the cores may be connected by point-to-point interconnects in a ring-based topology.

While different cache coherency protocols exist, many systems implement a so-called MESI protocol, i.e., a modified, exclusive, shared, and invalid protocol. Cache lines may be present in various ones of these states, which can be maintained in metadata associated with each cache line. Alternately, a directory-based coherence protocol may also be implemented. In any event, when a core desires to access a given cache line, it may send a request for data, which can cause various cache coherency protocol messages to be sent to other cores in a system to determine an owner of the data, as well as a location of other copies of the data. These messages can enable the data to be accessed, as well as to change a state of the corresponding cache coherency information.

Consider the case of a contended semaphore at address Z in a fully implemented cache coherency protocol system. If Core 0 is in contention at Z with Core 4, but the Distributed Tag Directory (DTD) information for Z resides at Core F, then the coherence traffic is as follows: 0 misses on Z and sends a request to F, which then sends a notice to 4, which then in turns hands the data to 0. Core 0 will modify the data at Z, and at some later point, 4 will miss on Z. Core 4 then requests to F, which notifies 0 and 0 sends the new data at Z to 4. The ping-pong effect from Core 0 to Core 4 has cost 16 communications hops, two L2 cache misses, two lookups at F over Z, and two coherence relay requests when 4 sends Z to 0, and then 0 sends Z back to 4.

However, this overhead can be substantially reduced by using new types of operations, each of which may be implemented as user-level instructions, in addition to standard coherence protocol operations. Although not limited in this regard, three operations, Peek, Poke, and PokeSwap, may be provided to perform data transfer operation while not affecting cache coherency in association with the data. The Peek operation is an operation that reads the data at a remote node, but does not invalidate or otherwise modify the coherence state associated with the data. The Poke operation is in essence, a blind swap operation that overwrites the data at a remote node, again not modifying the coherence attributes. The PokeSwap operation will extract the current value and insert a new value, such as realized using an exchange (xchg) operation. These operations are, in essence, "out of coherence" (0° C.) since they do not modify the coherence bits associated with the data involved. Further, snoop traffic associated with such operations can be avoided, in some embodiments. For example, in cases where a tag directory exists (distributed or central), then snooping is not needed. In cases where a central tag directory system of some form is not present, i.e., where a traditional chip multiprocessor (CMP)/symmetric multiprocessing (SMP) cache coherence system is implemented, then snooping may be performed to enable the "owner" core to respond to the request.

Thus optimized OOC patterns may be realized. Note that such optimized OOC patterns may be implemented using available instructions of an instruction set architecture (ISA) although in other embodiments, additional instructions to explicitly perform the primitives may be provided. Additional primitives such as post-increment and decrement Peeks, described below, and a compare-and-swap Poke that tests a target value, and if the expected value is present, a swap is performed, may also be provided. In one embodiment, the 0° C. primitives may map to ISA instructions as in Table 1.

TABLE 1

| OOC Primitive | x86 ISA | Description |
| --- | --- | --- |
| Peek | "mov" | (used as "load") |
| Poke | "mov" | (also used as "store") |
| PokeSwap | "xchg" | (swap) |
| PeekInc | "xAdd" | (read + increment) |
| PeekDec | "xDec" | (read + decrement) |
| CmpPokeSwap | "cmpxchg" | (compare-and-exchange) |

In the prior example, where Core 0 and Core 4 are in contention over a semaphore at Z, PokeSwap can reduce the entire overhead by a factor of two. However, by exposing such primitives and the concomitant failure to modify coherence bits can complicate shared data accesses with other cores. In the prior example, if Core 4 is sharing the data with Core 5, an inconsistent state is achieved in that Core 4 and Core 5 have differing values for Z, due to programmer error. To avoid such conditions, ownership of any data that will be accessed by such operations may be restricted to only one core. This may be achieved by providing a "pwned" status in the page table of the system. (Note: "pwned" is used as a slang form of "owned" that avoids conflict with the traditional "O" state in coherence protocols.)

Pages attributed as "pwned" in the page table can only live on one core. Once a page table has the "pwned" bits set to a non-zero value, the corresponding pages are set to the only core that is allowed to have that data in its caches. Any other core that attempts to access "pwned" data will detect the restricted ownership status, and then bypass the normal coherence mechanisms to directly read, write, or swap data values without transferring the associated cache line. Any program that accesses "pwned" data must expect the data to always be stale, unless the program is running on the core that is the true owner of the data.

By extending the page table to have restricted ownership via "pwned" bits, it no longer becomes necessary to explicitly extend an instruction set to provide the intrinsic Peek, Poke, and PokeSwap instructions. Rather, the coherence engine can detect the target address involved in any read, write, or xchg operation and automatically convert it from a normal fully coherent operation into an out-of-coherence communication. Still further, the coherence engine may perform these communications without the need for snoop messages to other system agents (e.g., other cores), in certain implementations. However, other implementations may provide user-level instructions to perform these operations.

Two further operations that may be provided in the larger context of operations are "PeekInc" and "PeekDec", which respectively perform a Peek operation followed by a post-increment or post-decrement at the true owner node. A remote node will obtain the original value, whereas the restricted owner node will have a modified value exposed to itself and all subsequent "pwned" operations. Thus embodiments can be used to further implement more sophisticated communications patterns, as well as true message-passing protocols with much lower overhead.

Note that if a request for "pwned" data arrives at a restricted owner node, and the request results in a local (e.g., a level one (L1)) cache miss, a next-level cache (e.g., a level two (L2)) cache of the restricted owner fetches the "pwned" data, and then responds to the request appropriately.

Thus embodiments provide extensions to existing coherence models, yet expose more explicit control over how the coherence engine is engaged to the programmer. For those programmers or tool vendors that have well-structured communications patterns, the faster primitives for coherent messages can result in substantial performance benefits when the data set and/or algorithm is highly communication dependent. By providing an interface mechanism for very fast coherent read-write commands, without the full overhead of traditional coherence read-write commands, smoother performance scaling can be obtained across a wide variety of workloads.

Figure 2:
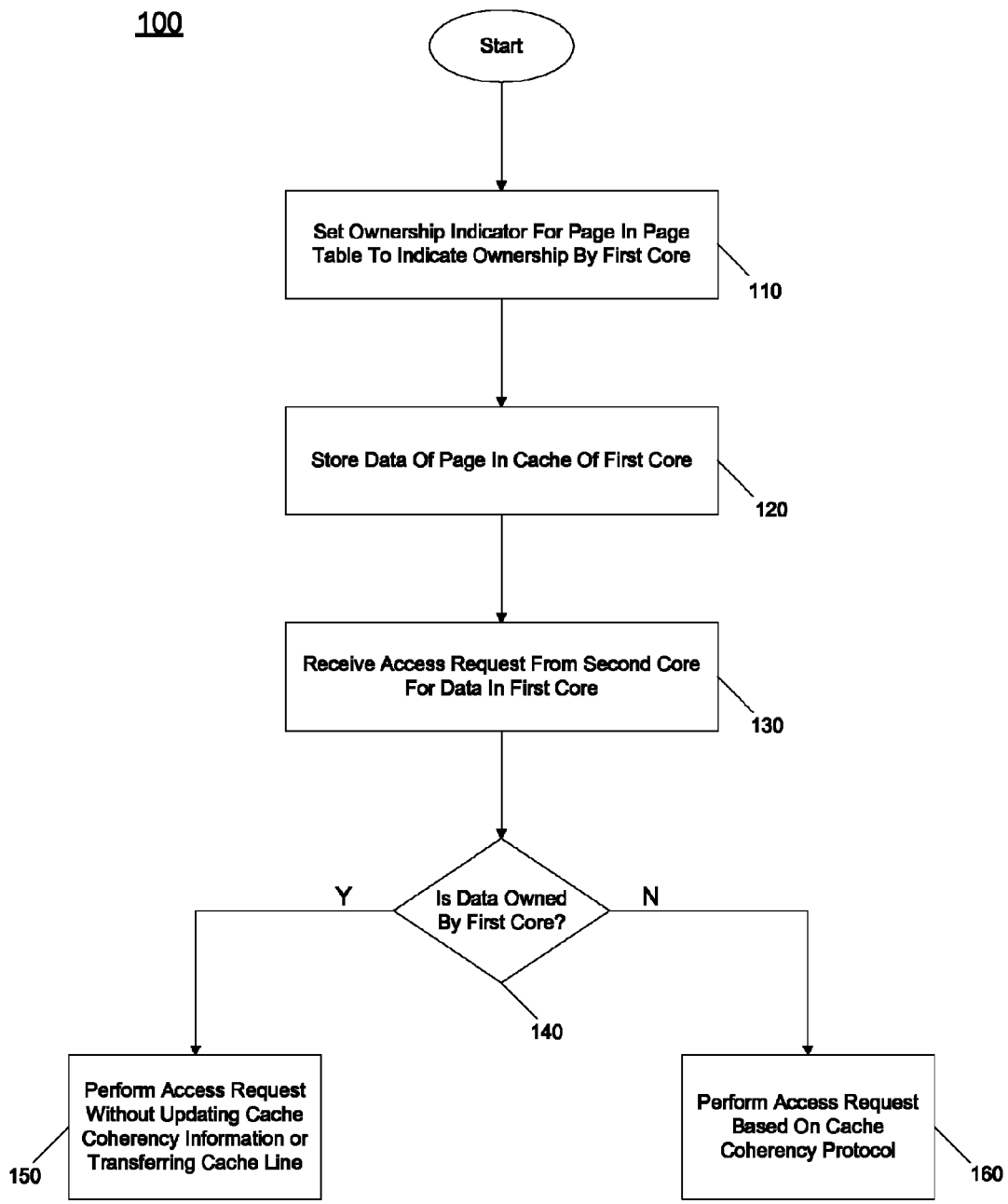
FIG. 2 is a flow diagram of a method in accordance with one embodiment of the present invention.

Referring now to FIG. 2, shown is a flow diagram of a method in accordance with one embodiment of the present invention. More specifically, FIG. 2 shows a method for handling data access requests in accordance with one embodiment of the present invention. As shown in FIG. 2, method 100 may begin by setting an ownership indicator for a page in the page table to indicate ownership by a first core (block 110). For example, in one embodiment this ownership indicator may be a pwned bit that is set to indicate that only one core is allowed to have that data in its cache, i.e., the first core.

Referring still to FIG. 2, data associated with a page for which a page table pwned bit is set may be stored in a cache of the first core (block 120). Then, during later operation a request may be received from a second core for data, namely data of the pwned page (block 130). Then it may be determined whether the data is owned by the first core (diamond 140). This determination may be made by analysis of the pwned bit, which in one embodiment may be performed by a coherence engine. If so, control passes to block 150 where the access request may be performed without updating any cache coherency information or transferring the cache line (block 150). More specifically, assuming the request is a request to read the data, the data may be provided to the second core without updating the cache coherency information or transferring ownership of the cache line. Still further, the coherence engine need not send snoop requests or other cache coherency traffic to other cores for this request.

If instead, at diamond 140, it is determined that the data is not owned by the first core, i.e., by analysis of the pwned bit, control passes to block 160, where the access request may be performed based on the given cache coherency protocol. That is, a state of the cache line may be determined an appropriate mechanism for providing the requested data to the second cache may be performed. For example, any needed cache coherency traffic is sent, a state of the cache coherency information may be updated, and the cached information provided. If needed, this could include transferring ownership of the cache line to the second core.

Figure 3:
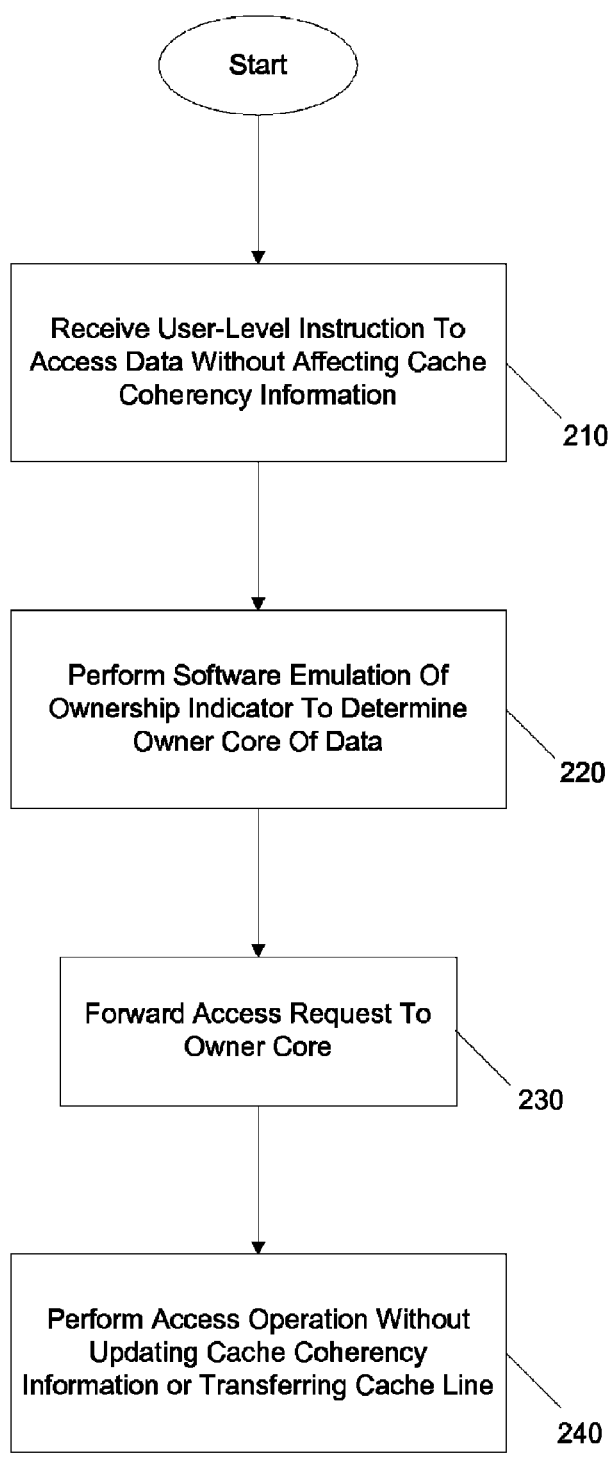
FIG. 3 is a flow diagram of a method in accordance with another embodiment of the present invention.

In other implementations, rather than indicating ownership of cache lines via a pwned bit, user-level instructions may enable handling of data requests in accordance with an embodiment of the present invention. Referring now to FIG. 3, shown is a flow diagram of a method in accordance with another embodiment of the present invention. As shown in FIG. 3, method 200 may begin by receiving a user-level instruction to access data without affecting cache coherency information (block 210). For example, such user-level instruction may be a Peek, Poke or Poke Swap instruction, although the scope of the present invention is not limited in this regard. To handle this request, software emulation of the ownership indicator may be performed to determine the owner core of the data (block 220). That is, a given software handler, which may be performed by a coherence engine, may be executed to emulate the operation described above with regard to FIG. 2, as in this embodiment there are no pwned bits associated with the page tables.

After performing such emulation, the request may be provided to the owner core (block 230). Then, the access operation may be performed without updating cache coherency information or transferring the cache line (block 240). For example, for a Peek operation, the data may be read from the owner core and provided to the requesting core without updating of the coherency state information. If instead it is a Poke operation, the data may be overwritten without modifying the coherency state of the data. Similarly, a Poke Swap operation may cause data in the cache to be overwritten and the extracted current value to be provided to the requesting core. While shown with this particular implementation in the embodiment of FIG. 3, the scope of the present invention is not limited in this regard.

Thus in one embodiment, a multi-core processor having cores each associated with a cache memory, can operate such that when a first core is to access data owned by a second core present in a cache line associated with the second core, responsive to a request from the first core, cache coherency state information associated with the cache line is not updated. To do this, a coherence engine may receive the data access request and determine that the data is of a memory page owned by the first core and convert the data access request to a non-cache coherent request.

In yet another embodiment, the processor can operate such that when the first core is to access data owned by the second core, responsive to a user-level data access instruction from the first core, the data access occurs without updating the cache coherency state information associated with the cache line. In this instance, the coherence engine, which typically receives data access requests and performs communications according to a cache coherency protocol responsive to the requests and cache coherency state information, does not perform such communications responsive to the user-level data access instruction.

Figure 4:
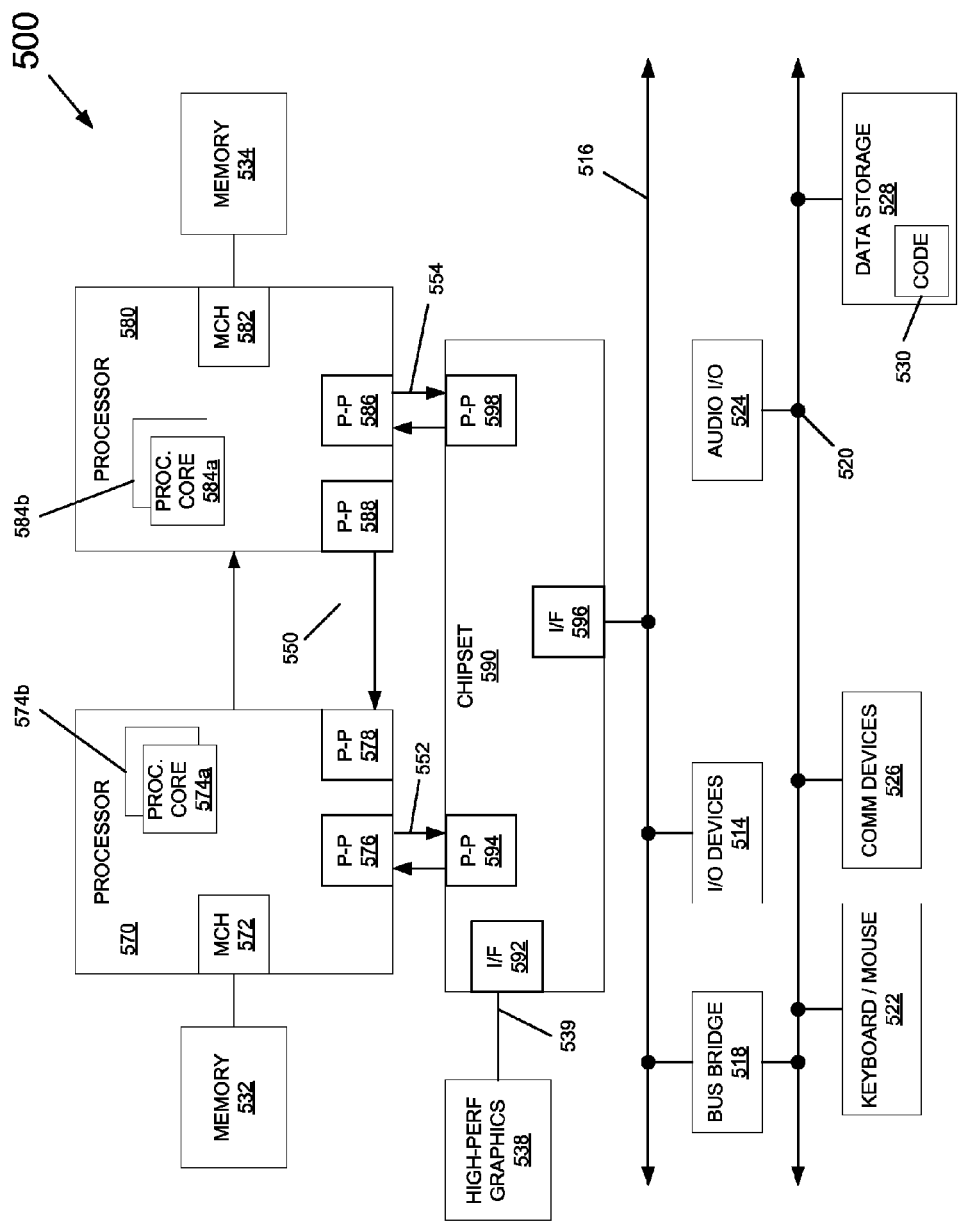
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b) of many processor cores. Each processor core may enable software control of a cache coherence scheme to improve inter-processor messaging in accordance with an embodiment of the present invention.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538 via a P-P interconnect 539. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor including a plurality of cores, wherein each core is associated with one of a plurality of cache memories, wherein a first core is to access data owned by a second core present in a cache line of a second cache associated with the second core without performing communications according to a cache coherency protocol if a page table associated with a page including the data indicates ownership of the page is restricted to a single core, and a coherence engine to perform coherence processing, wherein the coherence engine is to determine if the data is owned by the second core and if so, convert an access request for the data to a non-coherent request.

2. The apparatus of claim 1, wherein the first core is to access the data without updating cache coherency state information associated with the cache line.

3. The apparatus of claim 2, further comprising the page table to store information regarding ownership of a page by a given one of the plurality of cores.

4. The apparatus of claim 3, wherein the coherence engine is to access the page table to determine the ownership, and wherein the non-coherent request is to enable access to the data without updating the cache coherency state information.

5. The apparatus of claim 1, wherein the first core is to issue a write request and the coherence engine is to convert the write request from a coherent operation into a non-coherent operation in which the data in the cache line is to be overwritten with data of the write request and cache coherency state information is not updated.

6. The apparatus of claim 5, wherein the coherence engine is to convert the write request and not issue snoop messages to other cores.

7. The apparatus of claim 1, wherein the first core is to issue an exchange request in which the data in the cache line is provided to the first core and is then overwritten with a different value, and wherein cache coherency state information is not updated.

8. The apparatus of claim 1, wherein the first core is to issue a post-update operation in which the data in the cache line is provided to the first core and then the data is to be updated via an increment or decrement operation.

9. The apparatus of claim 1, wherein the data access is performed responsive to user-level software that has a priori knowledge of an access pattern of the data.

10. A system comprising:
a processor including a plurality of cores, wherein each core is associated with one of a plurality of cache memories, wherein a first core is to access data owned by a second core present in a cache line of a second cache associated with the second core, responsive to a user-level data access instruction of an application from the first core, the user-level data access instruction to cause the data access without affecting cache coherency state information associated with the data, based on a priori knowledge of a data access pattern of the application, and a coherence engine to receive data access requests and to perform communications according to a cache coherency protocol responsive to the requests and cache coherency state information, wherein the coherence engine is to determine if the data is owned by the second core and if so, enable the data access to be performed without update to the cache coherency state information or transfer of the cache line including the data, and convert the user-level data access instruction to a non-coherent request; and
a dynamic random access memory (DRAM) coupled to the processor.

11. The system of claim 10, wherein the user-level data access instruction is a write request and the coherence engine is to enable the data in the cache line to be overwritten with data of the write request and not update the cache coherency state information.

12. The system of claim 10, wherein the user-level data access instruction corresponds to an exchange request in which the data in the cache line is provided to the first core and is then overwritten with a different value, and wherein the cache coherency state information is not updated.

13. The system of claim 10, wherein the user-level data access instruction is a post-update operation in which the data in the cache line is provided to the first core and then the data is to be updated via an increment or decrement operation, and wherein the cache coherency state information is not updated.

14. The system of claim 10, further comprising a page table to store an ownership indicator for a page to indicate that only a single core is allowed to cache data from the page.

15. An apparatus comprising:
a multi-core processor including a plurality of cores, wherein each core is associated with one of a plurality of cache memories, wherein a first core is to access data owned by a second core present in a cache line of a second cache associated with the second core, responsive to a data access request from the first core, without updating cache coherency state information associated with the cache line based on an indicator in a page table to indicate that ownership of the data is restricted to a single core, and a coherence engine to receive the data access request and to determine if the data is of a memory page owned by the second core based on the indicator, and to convert the data access request to a non-coherent request.

16. The apparatus of claim 15, wherein the page table is to store a single bit to indicate ownership by the single core.

17. The apparatus of claim 15, wherein the data access request corresponds to an exchange request in which the data in the cache line is provided to the first core and is then overwritten with a different value, and wherein the cache coherency state information is not updated.

18. The apparatus of claim 15, wherein the data access request is a post-update operation in which the data in the cache line is provided to the first core and then the data is to be updated via an increment or decrement operation.

* * * * *